US007139478B2

United States Patent
Eggleton et al.

(10) Patent No.: US 7,139,478 B2
(45) Date of Patent: Nov. 21, 2006

(54) NONLINEAR DEVICE COMPRISING A SPECTRALLY BROADENING FIBER

(75) Inventors: Benjamin J. Eggleton, Summit, NJ (US); Tsing Hua Her, New Providence, NJ (US); Stefan Hunsche, Jersey City, NJ (US); Gregory Raybon, Shrewsbury, NJ (US); John A. Rogers, New Providence, NJ (US); Paul S. Westbrook, Chatham, NJ (US)

(73) Assignee: Fitel USA Corp., Norcross, GA (US)

( * ) Notice: Subject to any disclaimer, the term of this patent is extended or adjusted under 35 U.S.C. 154(b) by 304 days.

(21) Appl. No.: 10/275,134

(22) PCT Filed: Mar. 13, 2002

(86) PCT No.: PCT/US02/07862

§ 371 (c)(1), (2), (4) Date: Nov. 1, 2002

(87) PCT Pub. No.: WO02/075967

PCT Pub. Date: Sep. 26, 2002

(65) Prior Publication Data

US 2004/0208609 A1    Oct. 21, 2004

(51) Int. Cl.
*H04B 10/08*    (2006.01)
(52) U.S. Cl. .............................. 398/29; 398/147
(58) Field of Classification Search ........... 398/147, 398/148, 149, 93, 94, 95, 159, 29
See application file for complete search history.

(56) References Cited

U.S. PATENT DOCUMENTS

| | | | | |
|---|---|---|---|---|
| 4,556,314 A | * | 12/1985 | Stone | 356/73.1 |
| 5,661,554 A | * | 8/1997 | Calvani et al. | 356/73.1 |
| 5,717,510 A | * | 2/1998 | Ishikawa et al. | 398/199 |
| 5,943,151 A | * | 8/1999 | Grasso et al. | 398/147 |
| 6,259,542 B1 | * | 7/2001 | Saunders | 398/28 |
| 6,330,383 B1 | * | 12/2001 | Cai et al. | 385/37 |
| 6,456,411 B1 | * | 9/2002 | Ishikawa et al. | 398/192 |
| 6,587,242 B1 | * | 7/2003 | Shake et al. | 398/98 |
| 2002/0044322 A1 | * | 4/2002 | Blumenthal et al. | 359/161 |

* cited by examiner

*Primary Examiner*—Christina Y Leung
(74) *Attorney, Agent, or Firm*—Gardner Groff Santos & Greenwald, PC

(57) ABSTRACT

Embodiments of the invention include system for monitoring the effectiveness of pulse shaping in a nonlinear optical fiber (40). The spectral content of the pulse, after passing through the nonlinear fiber (40), provides an indication of how effectively the pulse was regenerated. A portion of the pulse exiting the nonlinear fiber is tapped off and its pulse energy is measured in at least one selected spectral region. The selected spectral region is one in which the pulse tends to gain energy when effective regeneration is taking place. The information concerning the effectiveness of pulse shaping in a nonlinear optical fiber is fed back to dynamically change the residual dispersion at the regenerator input. The spectral measurement leads to a control signal (48) to indicate a level of performance of the system, or to improve the performance of the system by adjusting an operational parameter.

6 Claims, 5 Drawing Sheets

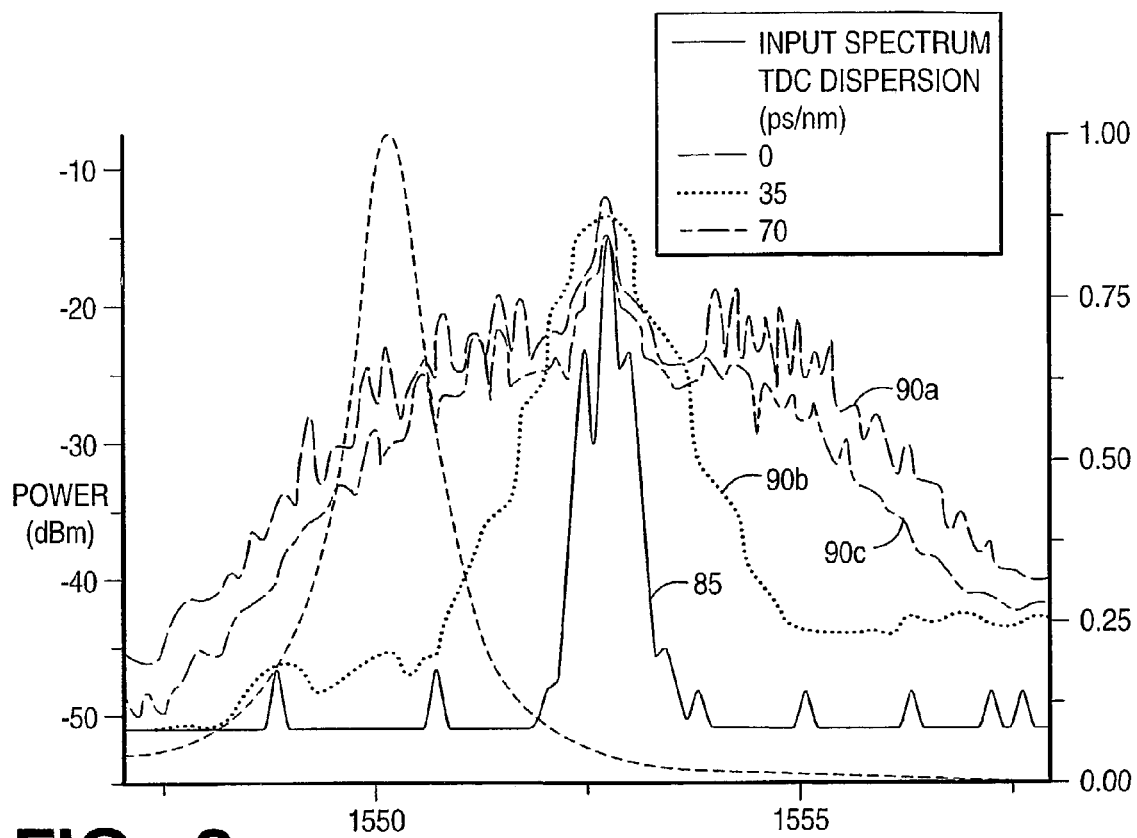
FIG 2
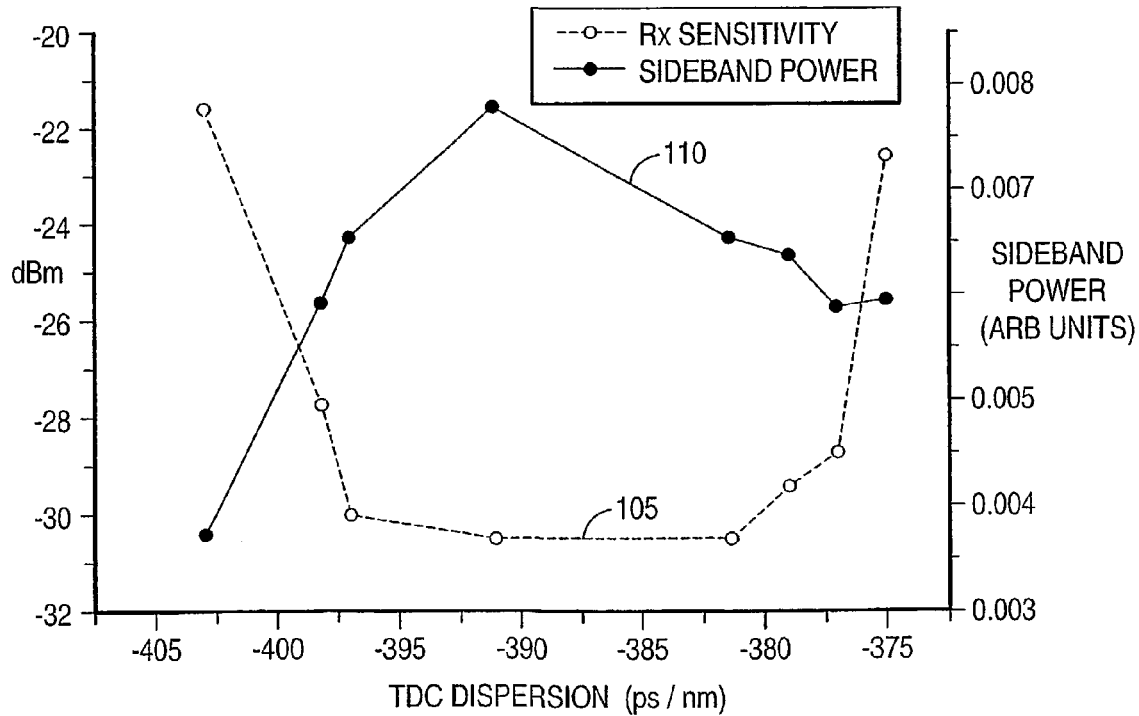
FIG 4 RECEIVER SENSITIVITY (FOR $10^{-9}$ BER) & TOTAL POWER IN $7^{TH}$ SIDEBAND AFTER REGENERATOR PLOTTED VS TDC DISPERSION

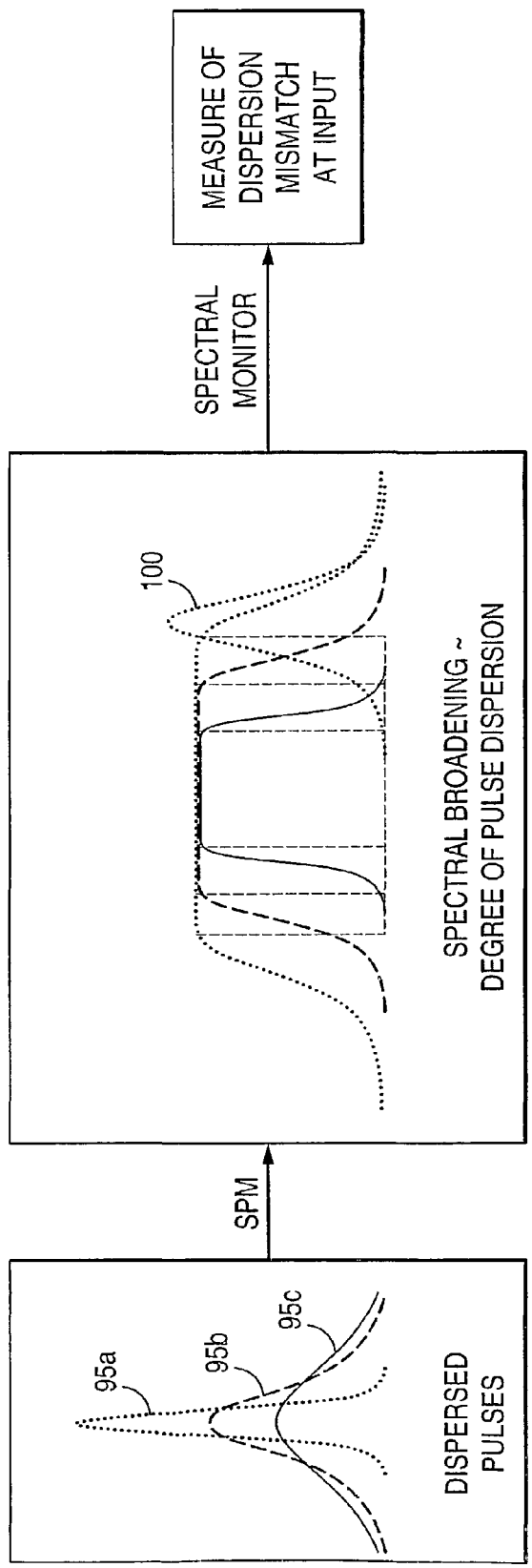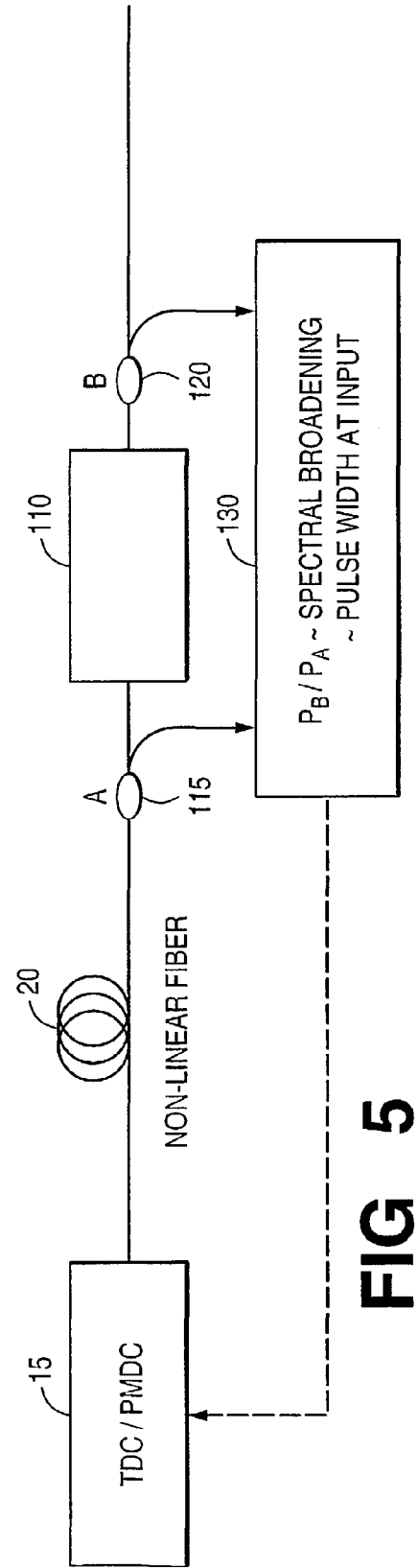

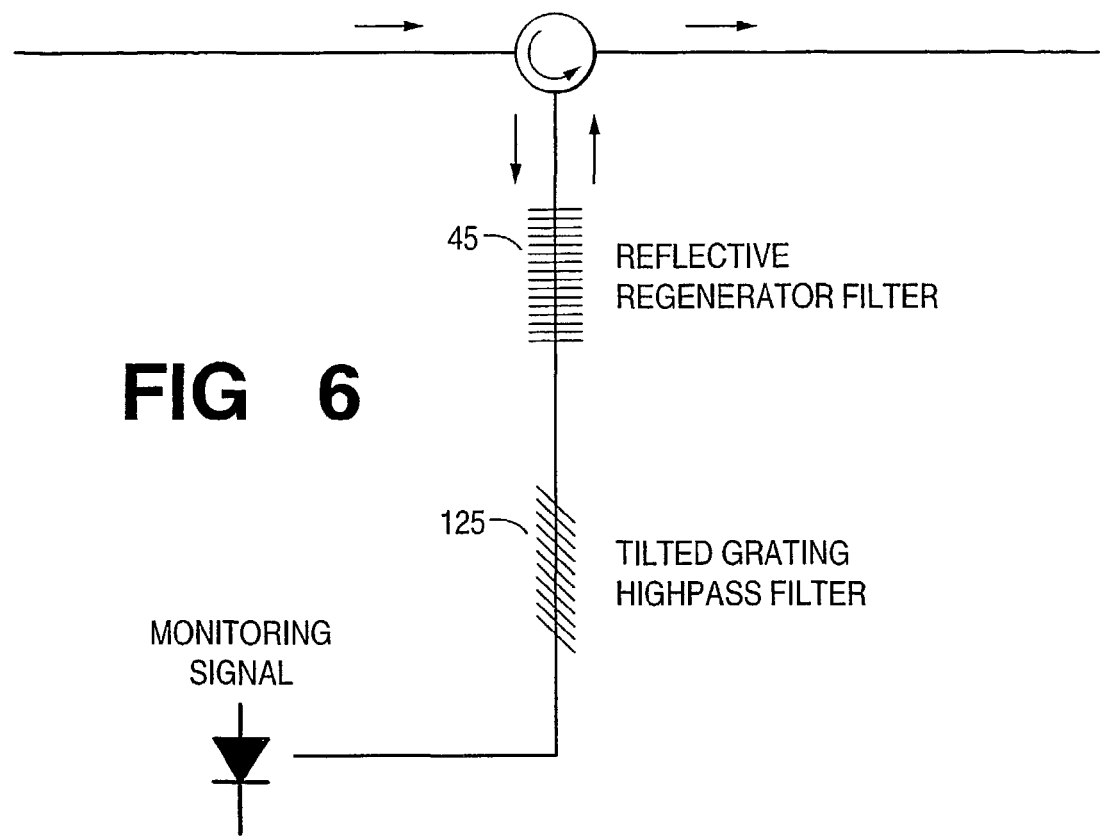
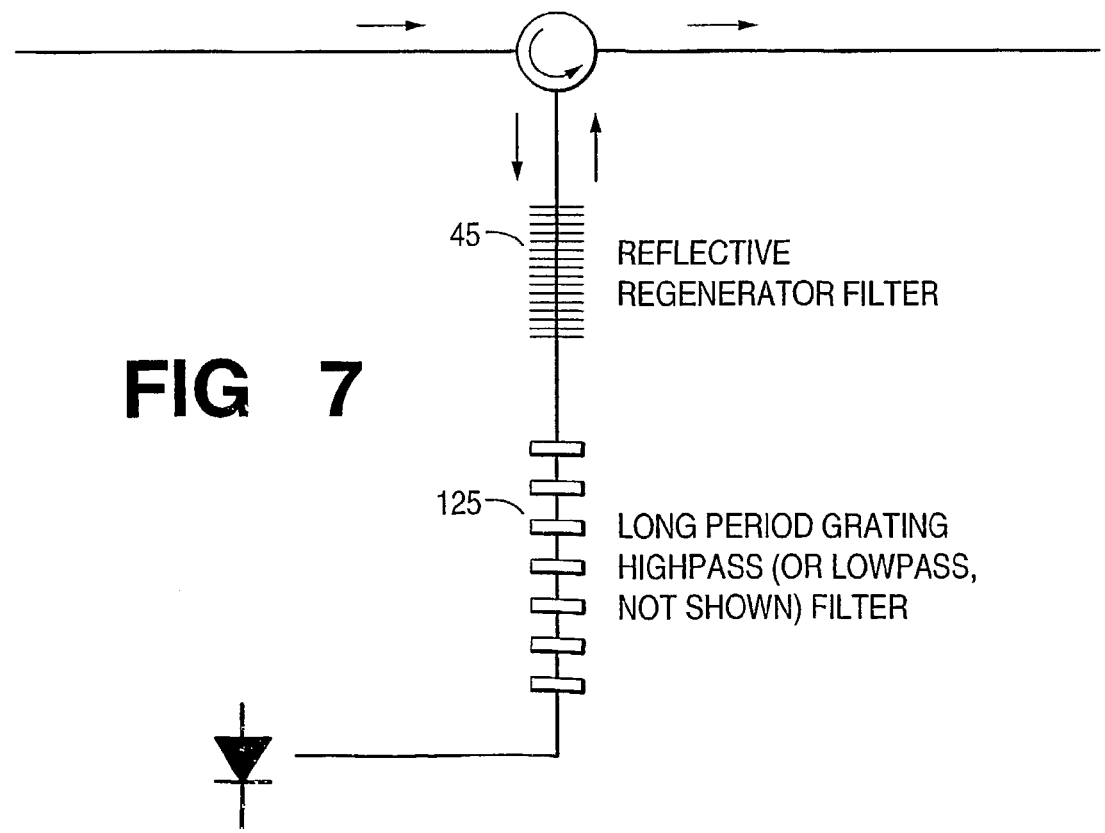

NONLINEAR DEVICE COMPRISING A SPECTRALLY BROADENING FIBER

FIELD OF THE INVENTION

The invention relates to pulse shaping techniques in optical fiber communication systems. More particularly, the invention relates to the use of non-linear optical behavior to restore degraded optical pulses.

BACKGROUND OF THE INVENTION

In high-speed optical fiber communication systems, digital data are transmitted in the form of optical pulses propagating in the fiber. An ideal pulse is well localized within a time window and has a well-defined amplitude that stands out distinctly from a low background level. However, noise, chromatic dispersion, and other effects tend to spread the pulses out and to obscure the distinction between pulse and background. These effects can lead to the misinterpretation of high pulse levels (e.g., "ones" in a binary system) as low levels (e.g., as "zeroes" in a binary system) and vice versa. This, in turn, tends to drive up the Bit Error Rate (BER) of the system.

Practitioners have devised regenerators for optical pulses. Ideally, optical energy enters a regenerator as a degraded pulse having a high noise level, a reduced peak amplitude, and expanded width, and exits the regenerator with low background noise and with its original peak amplitude and width restored. Even if they only approximate such ideal behavior, optical regenerators can be advantageous in communication systems for counteracting the degeneration of pulses over long propagation distances.

One particular approach to optical regeneration is described in U.S. Pat. No. 6,141,129, issued on Oct. 31, 2000 to P. V. Mamyshev under the title "Method And Apparatus For All-Optical Data Regeneration." Central to the Mamyshev regenerator is a nonlinear optical fiber, that is, an optical fiber that can alter the spectral content of a pulse of sufficient amplitude through nonlinear coupling between the fiber material and the electromagnetic field associated with the pulse. As a result of such coupling, stronger portions of a given pulse become spectrally broadened; but the amount of such broadening decreases sharply for weaker portions of the pulse. The spectrally altered pulse is then passed through a filter whose transmission characteristic is offset from the original spectral content of the pulse. We refer to such a filter as an "output filter" of the regenerator. The output filter substantially blocks the weaker portions of the pulse, which were not spectrally broadened, but substantially passes the stronger portions, which contain enhanced spectral content that lies within the passband of the filter. Because only the strongest portion, typically the central portion, of the pulse is passed by the filter, an approximation to the original shape of the pulse is obtained and relatively low background noise is eliminated. If desired, the original amplitude is restored by amplification before the nonlinear fiber, or after it, or both.

Typically, a Mamyshev regenerator includes a dispersion-compensator placed before the nonlinear fiber. The dispersion compensator is an element that has, in effect, a dispersion coefficient opposite in sign to that to which the pulses have been subject while propagating through the system. Such an element is selected, and in some cases can be tuned, to provide a sufficient amount of dispersion to at least approximately cancel the dispersion accumulated during propagation through the system.

We have discovered that in some operating regimes, the performance of the Mamyshev regenerator is very sensitive to the residual dispersion effects that remain impressed upon the optical pulses. However, the magnitude of these effects is not always known in advance. For this reason among others, there is a need for a device to monitor the effectiveness of pulse shaping in a nonlinear optical fiber.

SUMMARY OF THE INVENTION

The invention is embodied in a system for monitoring the effectiveness of pulse shaping in a nonlinear optical fiber. More specifically, according to embodiments of the invention, the spectral content of the pulse, after passing through the nonlinear fiber, provides a useful indication of how effectively the pulse was regenerated. Thus, according to the invention in a broad aspect, a portion of the pulse exiting the nonlinear fiber is tapped off, and a measurement is made of the pulse energy in at least one selected spectral region. The selected spectral region is one in which the pulse tends to gain energy when effective regeneration is taking place.

In specific embodiments of the invention, the selected spectral region is defined by the output filter of a Mamyshev regenerator. In such embodiments, one useful approach is to compare the pulse energy just after the output filter to the pulse energy just before the output filter. In other specific embodiments of the invention, the tapped off pulse energy is directed into an optical spectrum analyzer adapted to measure the energy in at least one spectral region such as a narrow band about a selected wavelength.

In another aspect, the embodiments of the invention involve an optical communication system in which the information concerning the effectiveness of pulse shaping in a nonlinear optical fiber is fed back in order to dynamically change the residual dispersion at the regenerator input. Even more broadly, the spectral measurement described above can lead to a control signal to indicate a level of performance of the system, or to improve the performance of the system by adjusting an operational parameter. Operational parameters that may be adjusted in this manner include the tuning of a tunable dispersion compensator situated before the nonlinear fiber, the gain of one or more optical amplifiers associated with the regenerator or situated elsewhere in the system, and the tuning of the output filter of the regenerator.

BRIEF DESCRIPTION OF THE DRAWINGS

In the drawings:

FIG. 2 is a graphical diagram of an input optical data stream superimposed with the data stream received at the spectral monitor of the optical communication system of FIG. 1;

FIG. 3 is a graphical diagram of the operation of the output filter in the regenerator in the optical communication system of FIG. 1 by showing the input spectrum into the output filter and the output spectrum exiting the output filter;

FIG. 4 is a graphical diagram of the sensitivity of the receiver in the optical communication system of FIG. 1;

FIG. 5 is a simplified, schematic diagram of an optical communication system according to an alternative embodiment of the invention;

FIG. 6 is a simplified, schematic diagram of a monitoring configuration according to an alternative embodiment of the invention;

FIG. 7 is a simplified, schematic diagram of a monitoring configuration according to yet another alternative embodiment of the invention;

DETAILED DESCRIPTION

Figure 1A:
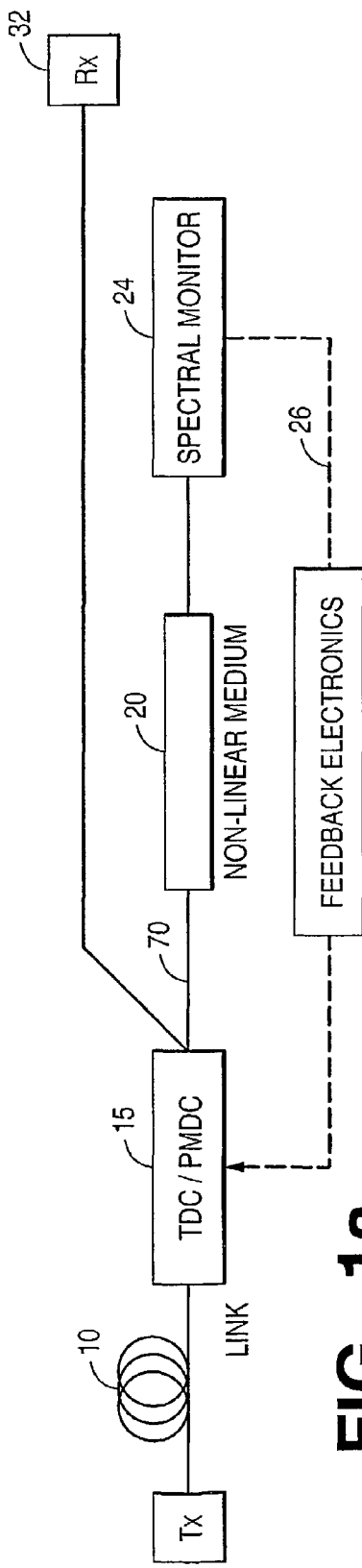
FIG. 1a is a simplified, schematic diagram of an optical communication system according to embodiments of the invention.

In the following description similar components are referred to by the same reference numeral to simplify the sequential aspect of the drawings and/or to enhance the understanding of the invention through the description of the drawings. Also, unless otherwise explicitly specified herein, the drawings are not drawn to scale.

Although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

Figure 1B:
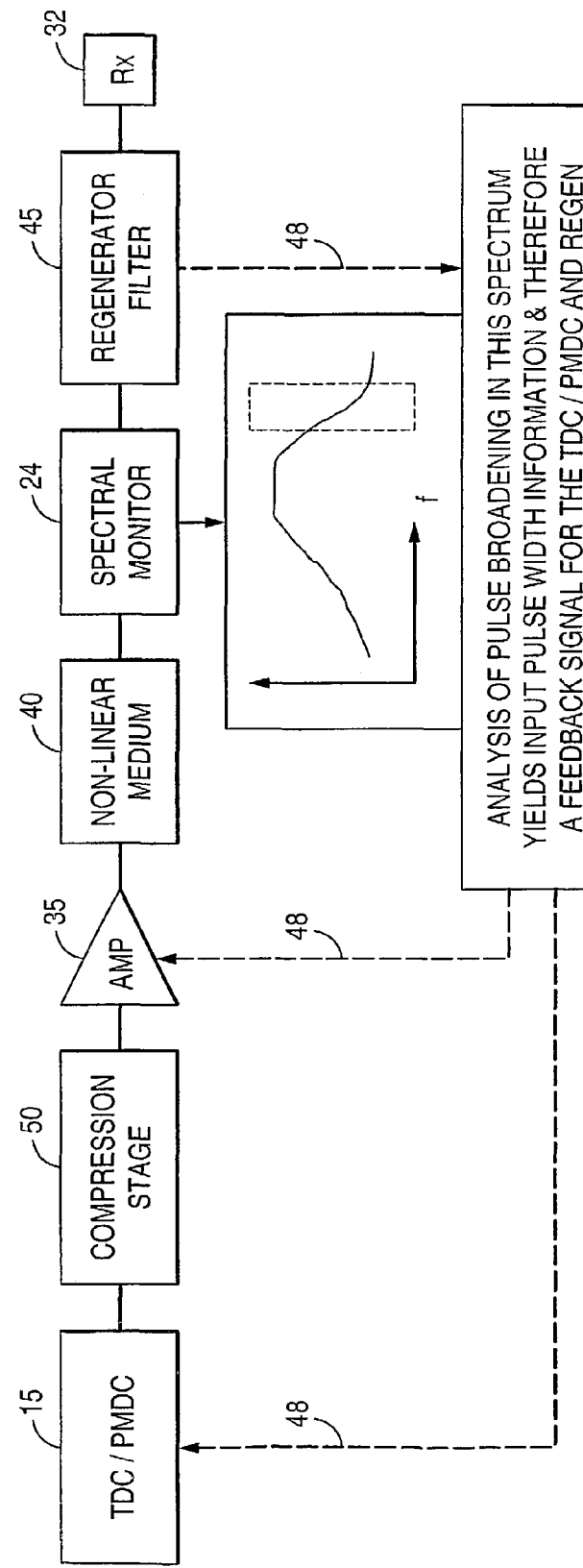
FIG. 1b is a simplified, schematic diagram of an optical communication system according to embodiments of the invention.
Figure 8:
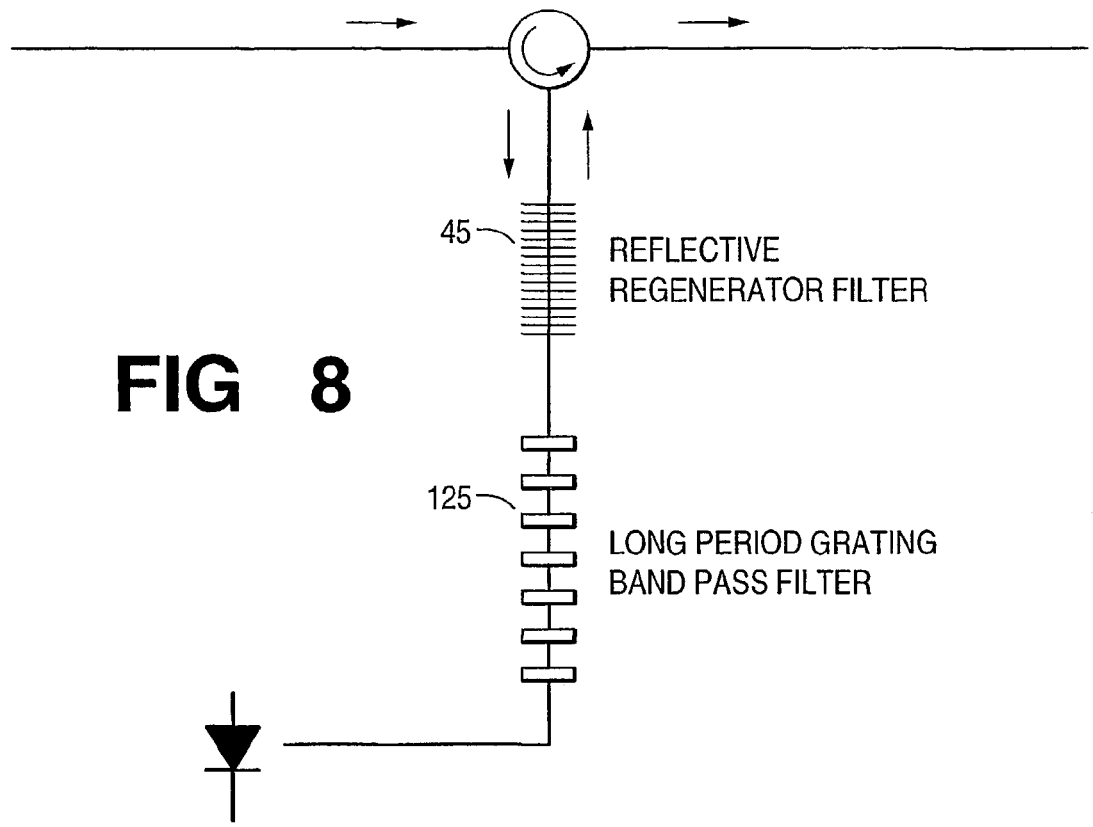
FIG. 8 is a simplified, schematic diagram of a monitoring configuration according to still alternative embodiment of the invention.
Figure 9A:
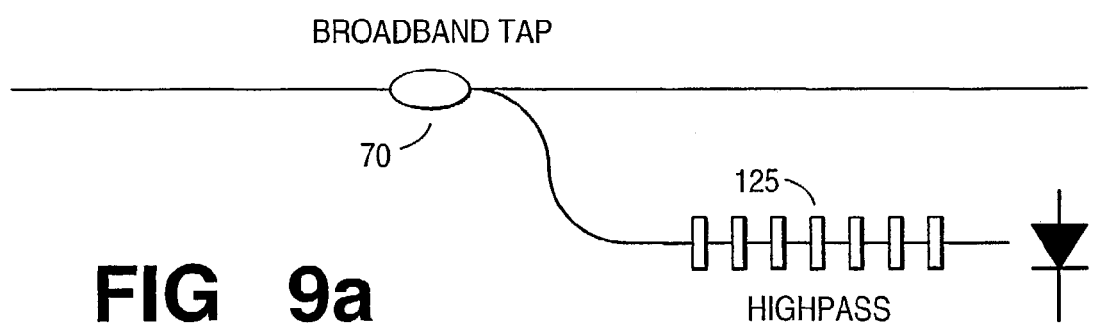
FIG. 9a is a simplified, schematic diagram of a monitoring configuration according to yet alternative embodiment of the invention.
Figure 9B:
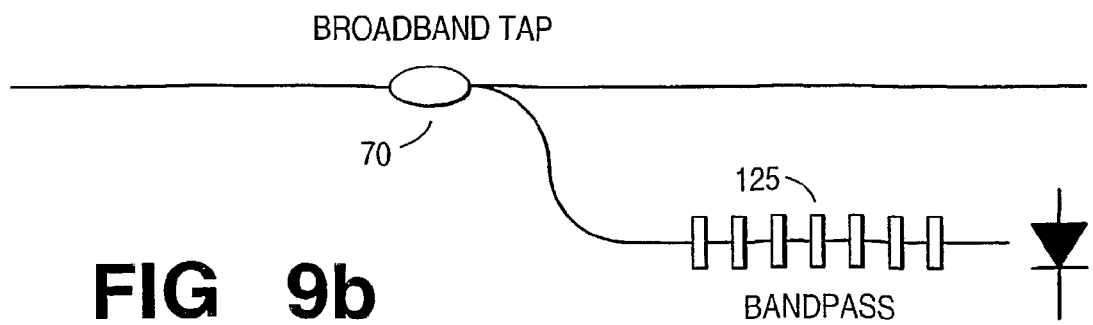
FIG. 9b is a simplified, schematic diagram of a monitoring configuration according to yet alternative embodiment of the invention.

The optical communication systems of FIGS. 1a and 1b includes communication optical fiber 10, tunable dispersion compensator 15, optical amplifier 20, regenerator 25, output optical fiber 30, and receiver 32. Regenerator 25 includes optical amplifier 35, highly nonlinear fiber 40, and output filter 45. Typical characteristics of fiber 40 are: 2.010 km length, 0.81 DB/KM attenuation at a wavelength of 1550 nm, dispersion at 1550 nm of −0.48 PS/NM-KM, D slope of 0.020 PS/NM2-KM, zero-dispersion wavelength of 1574 nm, mode-field diameter of 4.02 micrometer, cut-off wavelength of 1190 nm, and insertion loss of 2.5 dB.

A regenerator of the kind shown is described in the Mamyshev patent application cited above. In at least some cases, it will be advantageous to operate amplifier 35 in such a way that the signal entering highly nonlinear fiber 40 has constant average power. This is useful, for example, because otherwise, if the power increases, the spectral broadening will increase, even if the residual dispersion is constant. The system also optionally includes compression stage 50 situated before regenerator 25. A compression stage is useful for suppressing the effects of stimulated Brillouin scattering (SBS) in the communication fiber. The illustrative compression stage shown in the figure includes optical amplifier 55, highly nonlinear fiber 60, and standard single-mode (SSM) fiber 65. Optical compression is described, for example, in G. P. Agrawal, *Nonlinear Fiber Optics* Chapter 6, Academic Press 1995.

As noted above, dispersion compensators may be fixed or tunable. As will be explained below, tunable dispersion compensators such as compensator 15 are advantageous, because they can be tuned to optimize the performance of the optical regenerator. Tunable dispersion compensators are known in the art, and are described, for example, in U.S. Pat. No. 6,181,852, which issued on Jan. 30, 2001 to L. E. Adams et al. under the title "Optical Grating Device with Variable Coating," and U.S. Pat. No. 6,148,127, which issued on Nov. 14, 2000 to L. E. Adams et al. under the title "Tunable Dispersion Compensator and Optical System Comprising Same."

Very briefly, dispersion compensators of the kind described in the above-cited patents include a section of optical fiber in which there is formed a distributed Bragg reflector having a grating period that varies monotonically with distance along the fiber. The reflection of light by such a structure depends upon a resonant interaction between the incident light and the Bragg grating. Consequently, the effective distance that incident light will penetrate into the reflector before being reflected back out of it will depend upon the wavelength of the incident light. If the rate of change of the grating period (i.e., the "chirp") is appropriately adjusted, leading spectral components of a pulse can be relatively delayed, and thus brought into coincidence with trailing portions of the pulse, by arranging for the leading portions to penetrate more deeply into the reflector than the trailing portions. The amount of relative delay can be adjusted, i.e., "tuned," by controlling the rate of change of the grating period along the fiber axis. A control signal, which is by way of illustration an electrical signal, can be used to exercise the requisite control. For example, the chirp can be adjusted by applying a thermal gradient to the fiber in which the Bragg reflector is formed, or by mechanical deformation induced by using a solenoid to apply an axial force to magnetic elements affixed to the fiber. The control signal is readily used to control, e.g., a heater for applying the thermal gradient, or a current source for energizing the solenoid.

Also shown in FIG. 1a is optical tap 70, which diverts a portion of the pulse energy exiting highly nonlinear regenerator fiber 40 into monitor fiber 75, and from there into spectral monitor 80. As will be explained below, measurements made by spectral monitor 80 can provide an indication of how effectively the regenerator is operating. Typically, standard fiber will enter and leave the tap, although other types of fiber, including the nonlinear regenerator fiber, may also be used. Tap 70 may comprise, for example, a fused fiber coupler, tilted fiber grating, or a cut in the fiber coupled to bulk optics to direct some of the light into the spectral monitoring component and some back into the transmission fiber. The spectral monitoring may be achieved with any of various types of filters, including thin film interference filters, fiber Bragg grating filters, long period fiber grating filters, tilted fiber gratings, and etalons.

Superposed in FIG. 2 are the wavelength spectrum 85 of an input optical data stream as received by tunable dispersion compensator 15 from communication fiber 10, and the wavelength spectrum 90 of the data stream as received at spectral monitor 80. Spectrum 90 was measured with compensator 15 tuned for complete dispersion compensation. It will be apparent from FIG. 2 that the input data stream, which contains pulses that are spread out in time, contain energy in a relatively narrow range of wavelengths, whereas the compensated data stream, whose pulses are more narrowly confined in time, occupies a substantially broader spectral range. It will also be apparent that spectrum 90 of the compensated data stream contains many sidebands. This sideband structure is a result of the modulation of the data stream, which in this instance was carried out to produce a data rate of 40 Gb/s.

The operation of output filter 45 relative to the spectral broadening of the data stream is illustrated schematically in FIG. 3. In that figure, spectrum 95 is the spectrum of the data stream that exits the regenerator. Spectrum 100 is the passband of output filter 45. It will be understood that spectral broadening in the regenerator tends to increase the amount of energy in spectrum 95 that also lies within passband 100, and thus is substantially passed by filter 45. Significantly, various central frequencies and/or widths can be specified for spectrum 100. Filter 45 can be designed, and in some cases can be tuned, to impart specified central frequencies and/or widths. The precise design or tuning of filter 45 can affect the performance of the regenerator. Thus, filter 45 is advantageously selected or controlled so as to provide the best achievable performance.

We have found that the performance of the regenerator is very sensitive to residual effects of dispersion that are embodied in the optical pulses input to the regenerator. By way of illustration, we have plotted as curve 105 of FIG. 4 a series of experimental measurements of receiver sensitivity at receiver 32 of the system of FIG. 1a, as the tuning of dispersion compensator 15 was varied. The most complete cancellation of dispersion effects took place at a corrective dispersion, in the compensator, of about −390 ps/nm. The sensitivity plotted in the figure was the lowest received power level for which the bit-error rate (BER) was no more than 10-9. It will be evident from the figure that the most advantageous receiver sensitivity was obtained in a range of about 10 ps/nm about the optimum tuning of the dispersion compensator. When the compensator was tuned outside of and away from that range, the receiver sensitivity was found to degrade rapidly.

We have discovered a useful correlation between the amount of optical power in at least some of the spectral sidebands and the performance of the regenerator as determined, for example, from measurements of receiver sensitivity. By way of illustration, we have plotted as curve 110 of FIG. 4 the total optical power in a selected sideband at each of the settings of the tunable dispersion compensator that corresponded to the data points plotted in curve 105. The selected sideband was the sixth sideband on the long-wavelength side of the center wavelength. The center wavelength was 1552.6 nm, and the sixth sideband occurred at about 1554.5 nm. The sideband power was computed from a spectrum measured by spectral monitor 80 of the systems of FIGS. 1a and 1b. For the experiment represented by curve 110, the spectral monitor was a Hewlett-Packard Optical Spectrum Analyzer.

It will be evident from a comparison of curve 110 with curve 105 that relatively high values of the sideband power occur for that range of settings of the tunable dispersion compensator that yields the most beneficial levels of receiver sensitivity. As a consequence, the measured sideband power is useful as an indicator of how effectively the regenerator is operating. As will be discussed in more detail below, the measured sideband power can also be used in a feedback loop to automatically adjust one or more operational parameters of the communication system. For example, the measured sideband power, or a signal derived therefrom, can be used to control tunable dispersion compensator 15. As a further example, the same power or signal derived therefrom can be used to control the gain of an optical amplifier such as amplifier 35. As yet a further example, the same power or derived signal can be used to control output filter 45 by, for example, shifting its center frequency or modifying its bandwidth.

Experimental data according to embodiments of the invention have shown, e.g., that not all sidebands behave consistently as the tuning of compensator 15 is varied. For example, in the experiment represented in FIG. 2, we observed two wavelength regimes. Within an inner regime that, at a particular input intensity extended to about 2 nm on each side of the center wavelength of 1552.6 nm, both rising and falling sidebands were observed as the amount of dispersion compensation increased. However, in an outer regime of wavelengths more than 2 nm from the center wavelength, we found that the magnitude (i.e., the total optical power) of the sidebands increased consistently as the residual dispersion effects were reduced. With increasing intensity, the boundary between the inner and outer regimes moved further from the center frequency. This observation suggests that in at least some cases it will be advantageous, for purposes of spectral monitoring as well as for proper regenerator performance, to hold constant the power level within the regenerator.

One useful monitoring scheme is to monitor the power in a single sideband, selected to dependably lie within the outer wavelength regime. Another useful monitoring scheme is to measure the power in all sidebands greater than some order, or all sidebands lying within the outer regime. This second scheme is advantageous because it will typically provide a stronger monitor signal and thus relax the demands on the monitor hardware. However, we also observed that the sum of all high-order sidebands (i.e., the sidebands that had monotonic behavior with respect to residual dispersion) did not behave as consistently with respect to dispersion compensation as did certain single selected sidebands.

An alternative monitoring scheme is depicted in FIG. 5. Elements of the system shown in FIG. 5 that correspond to similar elements of the systems shown in FIGS. 1a and 1b are referred to by like reference numerals. The monitoring scheme of FIG. 5 uses a filter to perform spectral selection for purposes of monitoring. As illustrated, regenerator output filter 45 is also used for this monitoring function. In at least some cases, however, it may be preferable to use a separate filter, having distinct characteristics, to perform the monitoring function. In the system shown in the figure, coupling elements 115 and 120 are placed, respectively, just before and just after filter 45. Each of these elements is exemplarily a fused fiber coupler or other broadband tap, such as a fiber grating tap or a bulk optic tap. Each of elements 115 and 120 taps a portion of the light output from highly nonlinear fiber 40 into an optical detector that measures the optical power of the light that it receives. The ratio that the power received from element 120 stands in, relative to the power received from element 115, provides a useful measure of spectral broadening undergone in the regenerator. Thus, such a power ratio can provide a useful control signal or feedback signal.

Monitoring schemes using a filter 125 additional to the regenerator filter are shown in FIGS. 6–8, 9a and 9b.

It will be apparent to those skilled in the art that many changes and substitutions can be made to the embodiments of the invention herein described without departing from the spirit and scope of the invention as defined by the appended claims and their full scope of equivalents.

What is claimed is:

1. An optical communication system, comprising:
   an optical regenerator, including a nonlinear optical fiber that has a non-linear response to at least some input optical pulses, resulting in the spectral broadening of at least some such pulses, and including an output filter coupled to the nonlinear optical fiber;

a wavelength-selective detector configured to make measurements indicative of spectral broadening in the input optical pulses that have passed through the nonlinear optical fiber, wherein, for at least some pulses whose enemy is distributed into a central wavelength band and plural wavelength sidebands, at least a portion of the detector is configured to detect optical power in a respective sideband or group of sidebands exclusive of the central band; and a device or circuit, in receiving relationship to the detector, configured to provide a diagnostic signal or feedback signal, in response to the detected sideband optical power, in the course of operation of the system.

2. The system of claim 1, further comprising a tunable dispersion compensator (TDC) situated upstream of the nonlinear element optical fiber, and wherein said device or circuit is configured to provide a feedback signal for tuning the TDC.

3. The system of claim 1, further comprising one or more optical amplifiers situated upstream of the nonlinear element optical fiber, and wherein said device or circuit is configured to provide a feedback signal to at least one such amplifier, thereby to control the amplitude of pulses input to the nonlinear optical fiber.

4. The system of claim 1, wherein the detector comprises an optical spectrum analyzer configured to receive a portion of the energy of optical pulses exiting the nonlinear element optical fiber.

5. The system of claim 1, wherein the detector comprises: an element configured to detect a portion of the energy of optical pulses exiting the nonlinear element optical fiber prior to entry of said pulses into an optical the output filter; and a further element configured to detect a portion of the energy of said pulses alter passing through the optical output filter.

6. The system of claim 1, wherein the output filter is situated downstream of the nonlinear optical fiber and wherein the output filter has a passband, wherein the passband has a center wavelength, a bandwidth, and a band shape, and the detector is configured to provide a feedback signal effective for controlling at least one of said center wavelength, bandwidth, and band shape.

* * * * *